(12) United States Patent
Surpi

(10) Patent No.: US 8,423,488 B2
(45) Date of Patent: Apr. 16, 2013

(54) SYSTEM AND METHOD FOR BUILDING A PREDICTIVE SCORE WITHOUT MODEL TRAINING

(75) Inventor: Gabriela Surpi, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 659 days.

(21) Appl. No.: 12/629,712

(22) Filed: Dec. 2, 2009

(65) Prior Publication Data

US 2011/0131164 A1 Jun. 2, 2011

(51) Int. Cl.
*G06F 15/18* (2006.01)
(52) U.S. Cl.
USPC .......................................................... 706/14
(58) Field of Classification Search ............... 706/11, 706/13, 14; 701/11
See application file for complete search history.

(56) References Cited

U.S. PATENT DOCUMENTS

2002/0114435 A1\* 8/2002 Lawyer et al. ........... 379/114.14
2008/0091592 A1\* 4/2008 Blackburn et al. ............. 705/38

OTHER PUBLICATIONS

Teknomo, Kardi. "Normalization" Verified by wayback machine to Aug. 2008. [Online] Downloaded Jun. 21, 2012 http://web.archive.org/web/20080820030714/http://people.revoledu.com/kardi/tutorial/Similarity/Normalization.html.\*

\* cited by examiner

*Primary Examiner* — Ben Rifkin
(74) *Attorney, Agent, or Firm* — Mintz, Levin, Cohn, Ferris, Glovsky and Popeo, P.C.; James P. Cleary

(57) ABSTRACT

A system and method for building a predictive score without model training are disclosed. A set of predictive variables is defined based on raw data fields generated from raw data from one or more sources and domain knowledge. The raw data includes a historical set of transactions previously generated by one or more raw data sources. An scaled relative risk table to describe each predictive variable of the set of predictive variables is generated. The set of predictive variables is combined based on their associated relative risk tables to generate a predictive score for a future set of transactions.

8 Claims, 4 Drawing Sheets

Variable $V_1$

| Categories | Relative-risk |
|---|---|
| $C_A$ | $R_A$ |
| $C_B$ | $R_B$ |
| $C_C$ | $R_C$ |
| Missing | 1 |

=>

IS_FREE_EMAIL

| Categories | Relative-risk |
|---|---|
| Email free | 2 |
| Email not free | 0.5 |
| Email missing | 1 |

FIG. 2

| Categories | Relative-risk |
|---|---|
| Email free | 2 |
| Email not free | 0.5 |
| Email missing | 1 |

(proposed)

=>

| Categories | Relative-risk |
|---|---|
| Email free | 1.6 |
| Email not free | 0.4 |
| Email missing | 1 |

(scaled equivalent)

FIG. 3

SYSTEM AND METHOD FOR BUILDING A PREDICTIVE SCORE WITHOUT MODEL TRAINING

BACKGROUND

This disclosure relates generally to risk assessment systems and methods, and more particularly to a system and method for building and a predictive risk score driven by data fields without model training and deploying it.

When building a model to generate a predictive risk score for a client, it is desirable to be furnished with historical raw data (from that particular client and/or other, preferably similar, clients) that contains all the fields that will be available in the production environment and also the target the score will detect. The predictive score is then usually developed with a supervised model approach using a training technique like logistic regression or neural networks.

However, there are scenarios in which these conditions cannot be met. There are cases where the predictive fields are not consistently populated across the different historical datasets. In these scenarios, a substantial dataset cannot be built with all the desired fields to train a supervised model. In other scenarios, some fields are not present in the data, however they may be desired to be included in the model because they are known to be highly predictive. In still other scenarios, some historical raw data is present, but targets are missing or unreliable. In other cases despite the desire to build a robust model, the list of fields that will be available in the production environment at the time of scoring is not certain, might change over time, or might change from client to client. These scenarios and others require a new approach to build predictive solutions.

SUMMARY

In general, this document discusses a system and method for building and deploying robust predictive solutions without model training using limited historical data. First, a universal pool of variables' risk tables are built and scaled. Then, variables are combined into a score without model training being performed.

In one implementation, a technique to build a predictive score without model training includes the steps of defining the set of raw data fields to be used as input, and defining the predictive features (variables) that will be constructed from the raw data fields. The method further includes building a relative-risk table from data and/or domain knowledge to describe each predictive variable. Each relative-risk tables is scaled so that its average on the data being evaluated equals to 1. A self adaptive piece in the production environment is used to keep the average of each variable equal to 1. The method further includes combining the predictive variables into a predictive score, without model training. However, an ad-hoc formula is preferably used.

In one aspect, a method of building a predictive score without model training includes defining a set of predictive variables based on raw data fields extracted from raw data from one or more sources. The raw data includes a historical set of transactions previously generated by one or more raw data sources. The method further includes generating a relative risk table to describe each predictive variable of the set of predictive variables, and combining the set of predictive variables based on their associated relative risk tables to generate a predictive score for a future set of transactions.

In another aspect, a method of building a predictive score without model training includes using raw data from one or more sources, the raw data including a historical set of transactions previously generated by one or more raw data sources. The method further includes defining raw data fields from the raw data, defining a set of predictive variables based on the raw data fields generated from raw data from one or more raw data sources, and generating a relative risk table to describe each predictive variable of the set of predictive variables. The method further includes combining the set of predictive variables based on their associated relative risk tables, and generating a predictive score for a future set of transactions according to the combined set of predictive variables.

In yet another aspect, a system for building a predictive score without model training includes a computing system including a processor for executing instructions encoded in a tangible medium. The instructions include a data fields definition module for defining a set of predictive variables based on raw data fields generated from raw data from one or more raw data sources, a relative risk table generation module for generating a relative risk table to describe each predictive variable of the set of predictive variables, and a variable combination and score generation module for combining the set of predictive variables based on their associated relative risk tables, and for generating a predictive score for a future set of transactions.

Models built according to the techniques described herein are easier to develop, even from limited data, than traditional models. Further, these models are more portable, robust, have straight forward reason codes, and can be easily tuned or expanded in future revisits. These techniques can be applied, for example and without limitation, to generate a robust consortium model that can be deployed to clients that have never provided data, to generate an score combining predictive information from different domains, and/or to build an unsupervised model using domain knowledge.

The details of one or more implementations are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 2 illustrates a first step of generating a relative risk table.

FIG. 3. illustrates the second step of resealing a relative risk table.

Like reference symbols in the various drawings indicate like elements.

DETAILED DESCRIPTION

This document describes techniques and systems for building a predictive score without model training. These techniques and systems can be applied to, as an example and without limitation, generate a robust consortium model that can be deployed to clients that have never provided data, and clients for which it is unsure which fields will pass in the production environment. These techniques and systems can also be applied to generate a score combining predictive information from different domains, and to build an unsupervised model using domain knowledge.

Figure 1:
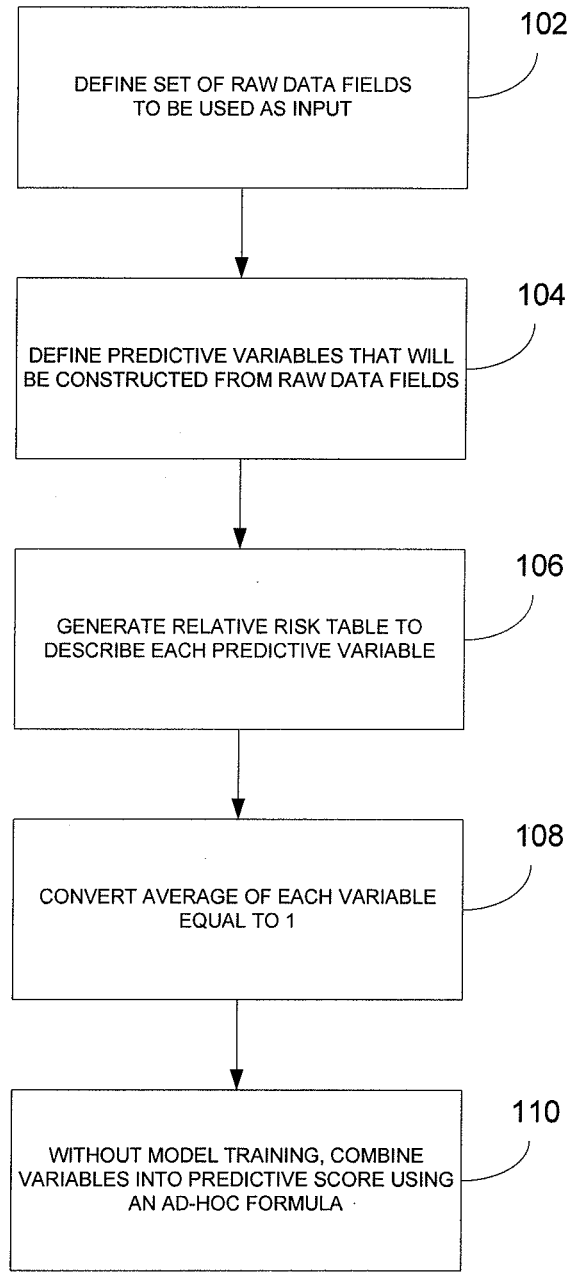
FIG. 1 is a flowchart of a method for building a predictive score without model training.

FIG. 1 is a flowchart of a method for building a predictive score without model training. At 102, a set of raw data fields to be used as input are defined. The predictive features (variables) that will be constructed from the raw data fields are also defined, at 104. At 106, a relative-risk table from data and/or domain knowledge is generated or built to describe each predictive variable. At 108, a self-adaptive component is used for a calculation to convert or keep the average of each variable equal to 1. The self-adaptive component is used to calculate, for each variable, the average value of the variable based on the last N transactions processed, or an approximation of such number, and rescale the variable by dividing by that value. N is defined to provide a statistically significant average, it can be set to a fixed number or to the number of transactions processed during certain time period. Without model training, at 110, the predictive scaled variables are combined into a predictive score using an ad-hoc formula. These general steps and techniques will be described in further detail below.

Building relative-risk tables: for each variable define a suitable set of bins and assign a relative-risk to each bin. In some implementations, generation of each table proceeds as follows:

If historical data with targets is available, all datasets that have the required field(s) can be used to define the table. If historical data is available but targets are missing or unreliable, the data can still be used to define a suitable set of bins, and the risks will then be assigned based on domain knowledge and insight provided by clients. If there is no data available, then both bins and risks will be estimated based on domain knowledge or insight provided by clients.

In one exemplary implementation, the first step of generating a relative risk table is shown in FIG. 2. All tables contain an entry for "Missing" with relative-risk 1, this represents that when the data field required to build the variable is blank an average risk will be assigned. R>1 means that category is expected more risky than the average. R<1 means that category is expected less risky than the average. The adaptive piece will scale RA, RB and RC so that they average to 1 when evaluated on the data. Since relative values of R in a table matters most, it can be stated in this example that "Email not free" is four times more risky than "Email free".

FIG. 3 illustrates the results of the second step where the relative risk table has been resealed. In this example we assume that in the data being evaluated 50% of the records have free email and 50% do not have free email, then the proposed table in FIG. 2. would give average relative-risk of 1.25=0.5*2+0.5*0.5. The adaptive feature scales the value of this variable dividing it by 1.25 which gives a relative-risk of 1.6 to free email and 0.4 to not free email. The proposed behavior is thus maintained: free email is four times riskier than not free.

Assume a model with: n variables: V1, V2 . . . Vn

Each variable according to its value falls into a category in the relative-risk table and gets assigned a scaled relative-risk:

n relative-risks: R1, R2 . . . Rn

A predictive score S (between 0 and 1) can be generated as:

$$S = \frac{a\left(\sqrt[n]{R_1 \times R_2 \times ... \times R_n}\right)^b}{1 + a\left(\sqrt[n]{R_1 \times R_2 \times ... \times R_n}\right)^b}$$

The formula for S is inspired in the relation of the odds of fraud given conditionally independent variables V1, V2 . . . Vn:

$$\frac{p(Y|V_1, V_2 ... V_n)}{p(N|V_1, V_2 ... V_n)} = \frac{p(Y|V_1)p(Y|V_2)}{p(N|V_1)p(N|V_2)} \cdots \frac{p(Y|V_n)}{p(N|V_n)} \left[\frac{p(N)}{p(Y)}\right]^{n-1}$$

Where Y is fraud, N non-fraud, and p(Y|V1, V2 . . . Vn), in short p, is the probability of fraud given V1, V2 . . . Vn. Then naming Oi the odds of fraud given Vi, and O the odds of fraud in the whole population:

$$\frac{p}{(1-p)} = \left(\frac{O_1}{O} \times \frac{O_2}{O} \times ... \times \frac{O_n}{O}\right) \times O$$

This allows writing p as a function of the product of the relative odds (Oi/O), which we referred before as "relative-risk" Ri, and for most practical purposes can be approximated by a relative fraud rate if wanted. Finally introducing the constant a and the power b/n, to generate a calibrated score S from p we get the former equation for S.

For S the adaptive piece keeps the score stable and the variables normalized so that reason codes are straightforward.

Figure 4:
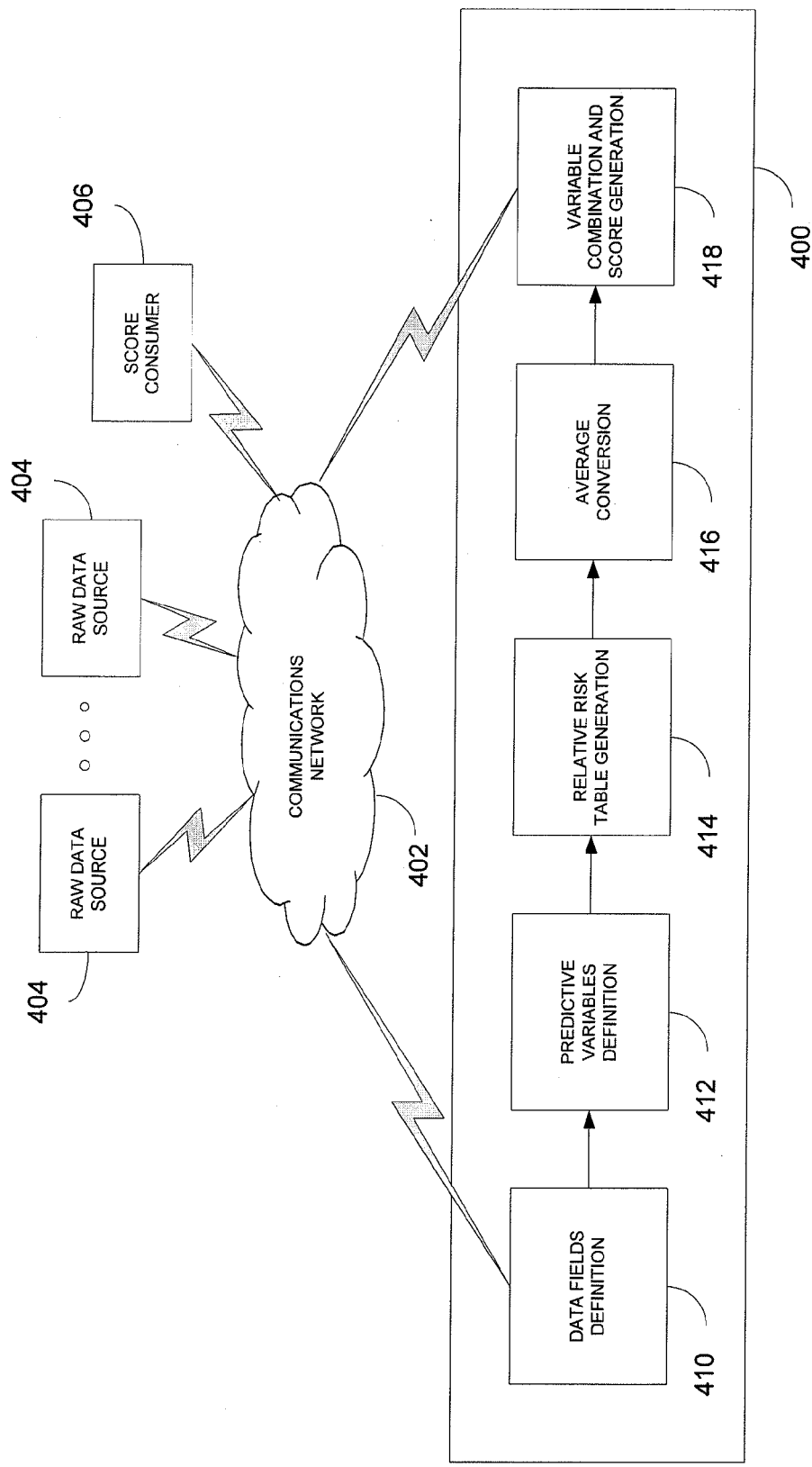
FIG. 4 illustrates a system for building a predictive score without model training.

FIG. 4 illustrates a system 400 for deploying a predictive score built without model training. The system 400 receives raw data from one or more raw data sources 404 through a communications network 402, and produces a predictive score from the model built without training for delivery to one or more score consumers 406 through the same or different communications network 402, or for internal use and storage.

The system 400 is preferably implemented in a computer program product, and includes a data fields definition module 410 for defining a set of raw data fields from the raw data sources 404 to be used as input to the system 400, and a predictive variables definition module 412 for defining predictive variables that will be constructed from the raw data fields. The system 400 further includes a relative risk table generation module 414 for generating or building a relative-risk table from data and/or domain knowledge to describe each predictive variable. The system 400 further includes an average conversion module 415, which is a self-adaptive piece in the production environment used to convert or keep the average of each variable equal to 1. Finally, the system 400 includes a variable combination and score generation module 418 for combining the variables into a predictive score using an ad-hoc formula, as substantially described above.

Some benefits of the techniques and systems disclosed herein include integration of knowledge, by which these techniques and systems efficiently incorporates all the information that is available from diverse sources, such as historical data from one or more products, domain knowledge, client feedback, etc. Systems and methods used according to the techniques herein are also more robust than other predictive scoring schemes, as they can be deployed under different scenarios, and do not make assumptions regarding which fields will be available at the time of scoring. These techniques have stable score distribution and straightforward reason codes. The variables with higher relative-risk R increase the score more. Further, predictive scoring methods and systems implementing the techniques herein are more easily tuned than other schemes. When new information becomes available, it can be easily incorporated by modifying, adding or deleting relative-risk tables, and this is a local change which does not affect the general structure of the model Some or all of the functional operations described in this specification can be implemented in digital electronic circuitry, or in computer software, firmware, or hardware, including the structures disclosed in this specification and their structural equivalents, or in combinations of them. Implementations can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers, for implementing the production environment. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

The production environment can also include a computer program (also referred to as a program, software, an application, a software application, a script, or code) which can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communications network. Examples of communications networks include a local area network ("LAN"), a wide area network ("WAN"), e.g., the Internet. Further, the communications network may include wired channels and/or wireless channels.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate implementations, may also be provided in combination in a single implementation. Conversely, various features which, for brevity, are described in the context of a single implementation, may also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular implementations of the invention have been described. Other implementations are within the scope of the following claims. For example, the steps recited in the claims can be performed in a different order and still achieve desirable results. In addition, implementations of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method of building a predictive score without model training, the method comprising:
   defining, by a computer, a set of predictive variables based on raw data fields generated from raw data from one or more sources, the raw data including a historical set of transactions previously generated by one or more raw data sources;
   generating, by the computer, a relative risk table to describe each predictive variable of the set of predictive variables;
   adapting, by the computer, each predictive variable to an average value of one; and
   combining, by the computer, the set of predictive variables having the average value of one using their associated relative risk tables to generate a predictive score for a future set of transactions;
   wherein each predictive variable is assigned an adapted relative risk R, and wherein for n rescaled relative-risks: R1, R2 ... Rn the eredictive score S can be generated as:

$$S = \frac{a\left(\sqrt[n]{R_1 \times R_2 \times ... \times R_n}\right)^b}{1 + a\left(\sqrt[n]{R_1 \times R_2 \times ... \times R_n}\right)^b}$$

where a and b are constants >0 to control a calibration of the predictive score S.

2. The method in accordance with claim 1, wherein the raw data includes domain knowledge of the set of transactions.

3. A computer-implemented method of building a predictive score without model training, the method comprising:
   accessing, by a computer, raw data from one or more sources, the raw data including a historical set of transactions previously generated by one or more raw data sources;
   defining raw data fields from the raw data;
   defining a set of predictive variables based on the raw data fields generated from raw data from one or more data sources;
   generating, by the computer, a relative risk table to describe each predictive variable of the set of predictive variables;
   adapting each predictive variable to an average value of one;
   combining the set of predictive variables having the average value of one using their associated relative risk tables; and
   generating, by the computer, a predictive score for a future set of transactions according to the combined set of predictive variables;
   wherein each predictive variable is assigned an adapted relative risk R, and wherein for n relative-risks: R1, R2 ... Rn the predictive score S can be generated as:

$$S = \frac{a\left(\sqrt[n]{R_1 \times R_2 \times ... \times R_n}\right)^b}{1 + a\left(\sqrt[n]{R_1 \times R_2 \times ... \times R_n}\right)^b}$$

where a and b are constants >0 to control a calibration of the predictive score S.

4. The method in accordance with claim 3, wherein the raw data includes domain knowledge of the set of transactions.

5. A system for building a predictive score without model training, the system comprising:
   a computing system including a processor for executing instructions encoded in a tangible medium, the instructions comprising:
     a data fields definition module for defining a set of predictive variables based on raw data fields generated from raw data from one or more raw data sources, a relative risk table generation module for generating a relative risk table to describe each predictive variable of the set of predictive variables;
     an average conversion module for adapting each predictive variable to an average value of one;
     a variable combination and score generation module for combining the set of predictive variables having the average value of one using their associated relative risk tables, and for generating a predictive score for a future set of transactions;
   wherein the relative risk table generation module is configured to assign each predictive variable an adapted relative risk R, and wherein for n relative-risks: R1, R2 ... Rn the predictive score Scan be generated as:

$$S = \frac{a\left(\sqrt[n]{R_1 \times R_2 \times ... \times R_n}\right)^b}{1 + a\left(\sqrt[n]{R_1 \times R_2 \times ... \times R_n}\right)^b}$$

where a and b are constants >0 to control a calibration of the predictive score S.

6. The system in accordance with claim 5, wherein the raw data includes domain knowledge of the set of transactions.

7. The system in accordance with claim 5, further comprising a communications network connected between the computing system and the one or more raw data sources.

8. The system in accordance with claim 5, wherein the communications network includes an extranet.

* * * * *